(12) United States Patent
Lindal

(10) Patent No.: US 6,311,447 B1
(45) Date of Patent: Nov. 6, 2001

(54) WOODEN FRAME BUILDING CONSTRUCTION

(76) Inventor: Walter Lindal, 1120 8th Ave., #2201 Seattle, WA (US) 98101

( * ) Notice: Subject to any disclaimer, the term of this patent is extended or adjusted under 35 U.S.C. 154(b) by 0 days.

(21) Appl. No.: 09/185,963

(22) Filed: Sep. 28, 1998

Related U.S. Application Data

(62) Division of application No. 08/640,181, filed on Apr. 30, 1996, now abandoned.

(51) Int. Cl.⁷ ....................................................... E04B 2/08
(52) U.S. Cl. ........................ 52/590.2; 52/233; 52/592.1; 403/326; 403/381
(58) Field of Search .................. 52/233, 286, 590.2, 52/590.3, 591.4, 591.5, 592.1, 592.4, 592.5, 665; 403/292, 294, 326, 381

(56) References Cited

U.S. PATENT DOCUMENTS

| | | | |
|---|---|---|---|
| 299,381 | * | 5/1884 | Grove .................................... 403/294 |
| 329,513 | | 11/1885 | Underwood . |
| 1,510,326 | | 9/1924 | Locke . |
| 2,801,895 | | 8/1957 | Gass . |
| 2,961,804 | | 11/1960 | Beckman . |
| 3,090,086 | | 5/1963 | Fata . |
| 3,237,360 | | 3/1966 | Mills . |
| 3,849,960 | | 11/1974 | Henry et al. . |
| 4,292,776 | | 10/1981 | MacDonald . |
| 4,305,238 | | 12/1981 | Harward et al. . |
| 4,765,103 | * | 8/1988 | Clarke .............................. 52/590.2 X |
| 5,475,960 | * | 12/1995 | Lindal .................................... 52/478 |

FOREIGN PATENT DOCUMENTS

| | | |
|---|---|---|
| 529215 | 12/1982 | (AU) . |
| 25284 | 9/1951 | (FI) . |

* cited by examiner

*Primary Examiner*—Carl D. Friedman
*Assistant Examiner*—Kevin D. Wilkens

(57) ABSTRACT

A method of joining, siding to studs, flooring to floor joists and, roof planking to rafters without the use of visible fasteners, such as nails and screws. The framing members, studs, etc., have rounded corners at their joining edge and rounded grooves close to this edge forming a rounded oval shaped knob for the length of the framing member. The cladding members (siding, etc), have oval shaped cross grooves, being the same shape and size of the knobs of the framing members, cut across them at the same spacing as the framing members. These grooves are undercut on each side so that when they are attached to the framing the undercut parts of the cross groove fit into the grooves along each edge of the framing member. Attachment is made by bending back the cladding at the cross grooves to open up the opening of the cross groove enough that it can be snapped over the knob of the framing member or the cladding can be forced over the knob edges by tapping it with a hard rubber mallet. Alternatively, oval cross ties can be floating so that cladding can be snapped on one or both sides. The bending back of the cladding is assisted by cutting saw slits across the cladding within the grooves to weaken the wood of the cladding between the cross grooves and the other side of the cladding making it easier to bend the cladding to snap it over the framing members without breaking the cladding at the cross grooves.

2 Claims, 2 Drawing Sheets

WOODEN FRAME BUILDING CONSTRUCTION

RELATED U.S. APPLICATION DATA

This application is a Divisional application of U.S. patent application Ser. No. 08/640,181 filed Apr. 30, 1996 now abandoned, which I sometimes refer to as Division III of Ser. No. 08/640,181.

This invention resulted from a series of experiments to accomplish the purpose of my U.S. Pat. No. 5,475,960 dated Dec. 19, 1995 which failed to pass ordinary sheer tests conducted by the Weyerhaeuser research laboratories in Federal Way, Washington. The purpose of that product and of this invention is to attach cladding, such as siding to studs, flooring to floor joists, roof planks to rafters and interior wood paneling to ceiling joists or partition framing without the use of visible nails and by direct application of the cladding to the framing just as it would be done if the cladding were face nailed to the framing. Face nailing often results in unsightly hammer marks and shiny nail heads showing on the paneling especially if the work is done by tradesmen who are not qualified as "finish" carpenters. Nail heads and crushed wood are also incipient encouragement to wood rot. The nails attract "sweating" and crushed wood has the protective oils squeezed out of it. Also, I have developed waterproof roof planks and siding and planks waterproofed by metal covering. It is impractical to face nail through the surface of these new products.

The joining edge of the framing member is rounded and has parallel grooves cut along the joining edge on each side close to the edge. This gives a "knob" like appearance to the edge of the framing member—which for ease of description could be called the male member and the siding or cladding with its cross groove could be called the female member, the cross groove is shaped exactly like the knob end of the male member which means that the sides of the grooves of the female plank are undercut so that "lips" are formed that fit into the side grooves of the male member. Up to this point my 1995 invention and my instant patent application are the same, the male knob and the female cross groove are to the same detail. Also, in both instances, cladding is forced over the knob at the edge of the framing members. This locking-on is aided by using a hard rubber mallet to tap the "female" cladding onto the "male" knobbed edge. U.S. Pat. No. 5,475,960 differs from this application in that it has one or two saw slits cut into the connecting edge of the male member which forms "lip" like corners that bend-in slightly when the male member is forced past the "lips" of the female groove and then snap back and lock into the undercut portion of the female groove. Not much force is required to accomplish this. A standard 8'×8' wall panel was tested with studs at 16" on center and the siding was locked onto the studs as described above. The base of the section, the bottom plate, was firmly attached to the floor of the test machine and mounting pressure was applied to a top corner of the panel at the double top plates. It did not take much pressure to bend back the leading lip of the first stud and in a ripping action the same pressure squeezed in the leading lip of each stud, one at a time, like a train engine starts moving its box cars one at a time, and then as increased pressure was applied the lips began caving in for the length of the studs and after about five inches of racking the studs began pulling out of the grooves, again in a ripping action. The joint failed miserably and was declared useless.

The joint could still be used for outside decks where sheer pressures were not a concern. However, here we got into trouble with incipient rot. Decking is spaced to allow rainwater to pass through it without puddles forming. This leaves the saw slits in the joists between the decking planks exposed to receive the rain and the open slits also invite bugs. The patent anticipated this problem and recommended that the slits be filled with caulking between the decking planks. But unfortunately, lazy workmen did not apply the caulking even though they were supplied with the caulking and caulking guns. My 1995 invention is almost a total failure. I had to find an answer. In order to avoid the problems referred to above, with saw slits facing upward in decking applications, it occurred to me that the saw slits should be in the female member and face downward. First I tried putting the saw slits along each side of the cross grooves in the female member. I tried varying depths of saw slits and different spacing from the cross grooves and I tried pairs of saw slits on each side with varying depths. I was quite successful in getting varying combinations to work as snap on joints, but in ordinary sheer tests the "lips" between the saw slits and the cross grooves split off sometimes easily, but always before the desired total design force was applied. I then tried putting the saw slits into the grooves and into the wood above the grooves. This worked well. With the saw slits in the grooves, all species of wood worked well and passed the sheer tests. Actually, as more pressure was applied to a top corner of the test panels the stronger the new joint became. I now had a dovetail joint that allowed firm application of cladding to all framing. However, the cladding could still slide along the knobbed edges of framing members and it was necessary to use a small finishing nail hidden in the joints between the wood cladding planks to prevent this sliding from occurring. Also, as the saw slits faced downward in outside decking, no rain could get up into the slits, nor could any insects and also mold could not even spread into the saw slits. I have accomplished the goal of my first invention I can attach cladding to framing without visible fasteners.

I continued my studies on my dovetail joint and realized that the key element of my joint was the knobbed edge of the framing members that could virtually be sawn off at the side grooves to form a sort of an oval shaped dowel. Then, if this oval shaped dowel were nailed to a surface or across framing, cladding could be snapped onto the oval shaped doweling. Also, if the cladding were to be Tee shaped with tongue and grooves on the edges of the top of the tees and the tee stems notched to snap over a "floating" oval shaped dowel it would be possible to build a two sided panel with each side having its Tee top tongue and groove planks locked together so the panels could be locked on each side of the floating dowels or a series of parallel floating dowels making a very solid panel. The stems of the tees would snap on alternatively on each side and as long as the Tee tops were more than twice as wide as the width of their stems then there would be ample room for the opposing Tee stems to snap onto the same dowels between each other, and the Tee top tongue and grooves could be slid tightly together.

We have tried many different ways to make houses out of bamboo on a mass production basis. Of course bamboo has been used to build shelter world wide and over past centuries. The "floating" oval shaped dowel proved to be a good answer for mass production. The bamboo logs are split longitudinally in half. Then, like the stems of the tees, a series of oval shaped grooves are cut into the edges of the half "pipe" like bamboo logs so that opposing half pipe sides of the same log are notched at the same level and that similar half "pipe" like logs are cross notched at the same spacing to be snapped onto oval cross ties say 2 feet apart. If half bamboo logs are snapped onto each side of a series of floating oval cross ties a strong wall or roof panel can be made. The bamboo nodes will need to be cut back and notched to receive the edges of the opposing half pipe like logs. The nodes on the bottom sides of roof panels will need to be notched down to the pipe like surface so rain water that comes in between the upper half "pipe" like logs will drain away. In colder areas the hollow spaces in the bamboo half logs can be filled with foamed insulation, which will also help tie the half logs together and strengthen the assembly.

Again, hidden small finishing nails will be needed to prevent the half "pipe" logs from sliding on the oval cross ties. Also, wall and roof sections should be made to speed construction and they should be limited in weight to "two man" load size.

I tried to make use of cross ties that were ache "H" shaped in cross section or the shape of dumbbells. These gave a much more positive connection between say studs and siding or two layers of Tee plank sections. However, it was painfully slow to assemble the sections especially when several cross ties were involved. The cladding would bind on one cross tie or another when I tried to slide the pieces along the series of cross ties. It took hours to apply decking on a small deck and wall siding had all to be slid from the top of the dovetail edge of the studs to the floor. The cost of labor to assemble walls and floors using very positive dovetail joints for houses was unacceptable. Also, it was impossible to drive Tee shaped siding across the studs one stud at a time into notches lined up on the studs; the tees would soon bind up so they could not be driven all the way. The snap on system allowed assembly to happen as fast as the cladding could ordinarily be face nailed onto the framing. I was well aware of the art such as taught by J. R. Grove U.S. Pat. No. 299,381 May 27, 1884 and used in regular cabinet work over many years, but it just would not work beyond tying two or three pieces of cladding together by driving the cross ties lengthwise through notches in the opposing layers of cladding. It was only used in cabinet work as taught by the inventor back in 1884. My snap on method of attaching cladding solved all of the problems. Inventor Neville Clarke's invention U.S. Pat. No. 4,765,103, Aug. 3, 1988 relied on similar very positive dovetail connections as originally taught by J. R. Grove. The dimensions of Clarke's female plank are such that it appears impossible to bend it to widen the cross groove enough to snap over the male knob; also, saw slits in the groove that were deep enough to allow opening up the groove would compromise the integrity of the female component and the lips of the cross groove appear far too delicate to allow hammering the female plank over the knobbed male edge. If forced on, the lips would shear off, making the junction ineffective. It could be stated that a knowledgeable cabinetmaker could easily arrive at my method of snapping together a dovetail joint. However, what snaps on readily can snap off just as easily and, as most such cabinet jointing covers short joint areas, the craftsman would prefer the more positive slide on method and would not be motivated to design a snap-on method. My need was different from the usual cabinetmaker's need. I wanted to apply planks on large rafter roof areas and siding on large studded wall areas. I had developed waterproof planks and metal covered waterproof planks that could not be face nailed to the framing. Though not as positive, my snap-on method was ok because each piece of siding or roofing would be applied to multiple studs or rafters and would also be joined by tongue and grooves to adjacent cladding. An uplift force like the vacuum caused by a hurricane would have to tug simultaneously against a multiple of joints. Hurricanes do lift whole roofs off buildings, they do not lift off the roof boards one-by-one. My system would behave like the nailed-on roof systems. A cabinetmaker would have fewer joints under strain and could take the extra time to make each joint more positive. A craftsman does have to have new needs to be motivated to invent new means to solve them. I was so motivated. Over the years other inventors have patented useful assemblies that require more positive dovetail joint connections than mine, but none have yet come up with a system that allows the direct application of plurality of cladding pieces to a plurality of cross ties or knobbed framing members. My invention is a first.

BRIEF DESCRIPTION OF DRAWINGS

FIG. 3 is a cross section of a bamboo wall also showing modification to make it work as a roof system.

FIG. 4 shows how an oval shaped cross tie is used to lock two layers of half bamboo logs together. Note the saw slits that help the bamboo to snap over the cross ties.

FIG. 5 shows the action of a half bamboo log being snapped over a cross tie already fastened into the edges of another half bamboo log.

FIG. 6 shows a two layer section made of Tee ("T") shaped planks that are snapped over an oval shaped cross tie. The tops of the Tee planks are tied together with tongue and grooves on both sides of the oval shaped cross tie.

FIG. 7 shows the oval cross tie in cross section with a layer of Tee ("T") planks locked onto each side. Note the saw slits in each of the Tee plank tops.

FIG. 8 is a detail of FIG. 10 showing the area where the Tee shaped flooring locks over the oval cross ties that are nailed into notches on top of the beams.

FIG. 9 is a cross section of the oval shaped cross tie nailed into a square notch in the beam and with the Tee shaped flooring planks snapped over the cross ties.

FIG. 10 shows a floor assembly complete with Tee ("T") shaped flooring, built up beams, ceiling lining on the underside of the beams and the cross ties that are nailed into square notches in the top of the built-up beams with the flooring snapped over the oval shaped cross ties.

BEST MODE FOR CARRYING OUT THE INVENTION

Figure 1:
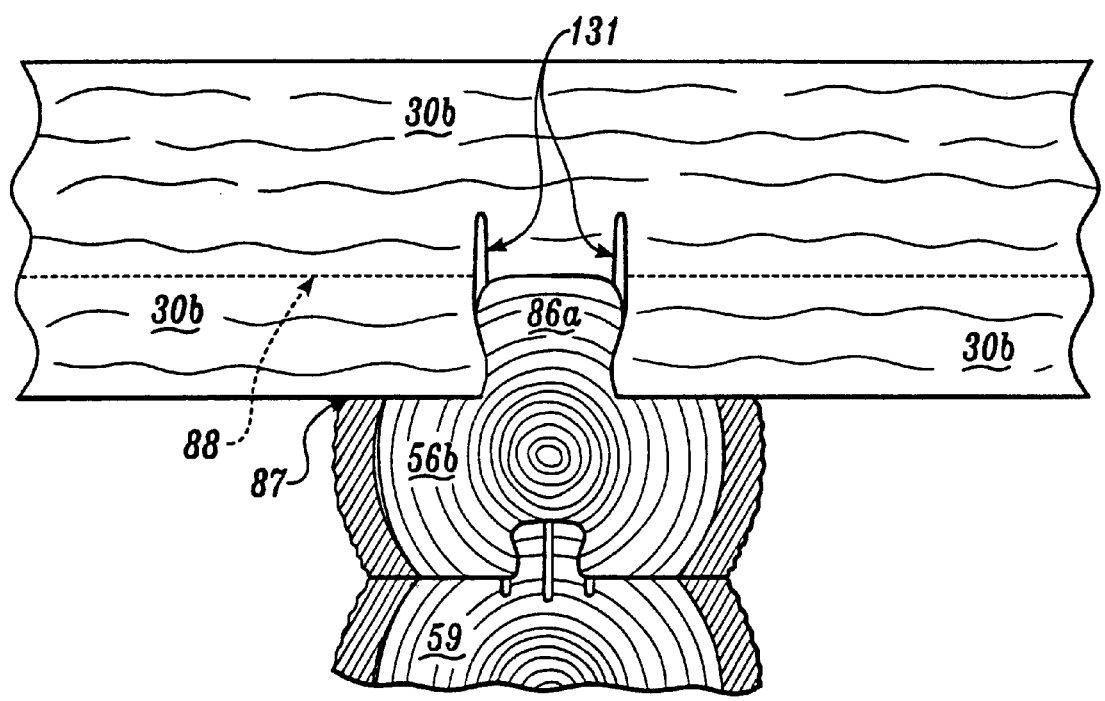
FIG. 1 shows a female plank with saw slits cut into its cross groove that aided the attachment of the female plank to the male framing member.
Figure 2:
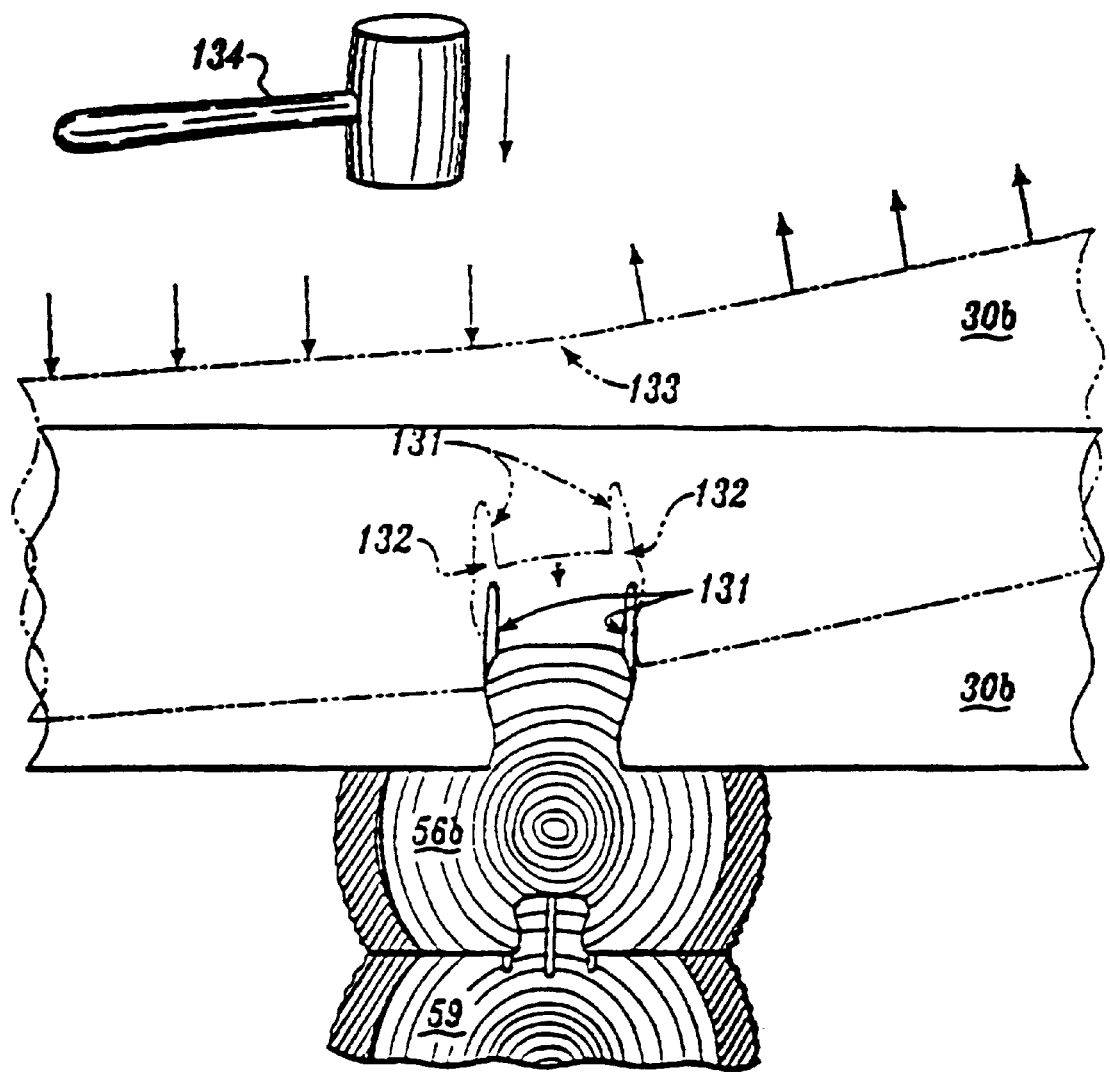
FIG. 2 shows the action of the female plank being hammered onto the framing member. Note how the saw slits open up to show how they help the female plank to snap over the knob of the male plank.

Drawings FIGS. 1 and 2 show the new joint system. FIG. 2 shows the female planking 30b being bent upwards so as to open up the cross groove so that it can snap over the round knob of the timber 56b. This action can be aided by hammering the plank 30b over the knob using a hard rubber mallet 134.

FIGS. 1 and 2 introduce saw slits 131 that weaken the plank 30b should it be of a species that is too stiff to bend open. 132 is a widening slit 131 opening up the cross groove so that it can snap over the knob of 56b. Again the rubber mallet 134 can be used to do the bending of plank 30b. Note that the orifices of the saw slits 131 face downward so that water cannot flow into them.

FIGS. 3, 4 and 5 introduce how the new jointing system using floating oval shaped cross ties 89 can tie together to half pipe like bamboo logs 134 and 134a by bending them away from the cross grooves to open up the grooves on the pipe like edges so that they can snap over the oval shaped cross ties aided by the saw slits 100.

Bamboo has nodes 135 which coincide with diaphragms 138 that need to be cut back if they happen to meet when cut in half and put together or they have to be notched to receive the pair of the pipe like edges of opposing half logs and in the case of the bottom halves of roof sections they have to be notched to the bottom of the pipe like bamboo halves 137.

108 is the hollow space inside the pipe-like bamboo logs. 116 are small finish nails that fix the oval cross ties to the edges of the bottom layer of half bamboo logs. 136 indicate a space between the cross ties that indicate the end of a two man load sized section from another similar sized section. 139 indicated the cross section line of FIGS. 4 and 5. FIG. 5 shows the action of the top half log 134 being snapped over the cross section 89, of the floating cross tie. FIG. 4 shows the two half logs and the cross tie all tied together. 140 is the tight space between two half logs 134a that is where the nodes have been planed down to enable the tight space which are further held tightly together by notches cut into the inside diaphragms 138. 142 are heavier nails that tie the bamboo section to supporting beams or walls. 141 shows where two sections separated at 136 are joined together.

FIG. 6 illustrates two half sections of Tee (T) shaped planks tied together by a floating oval shaped cross tie 89. The tee shaped planks 31 and 31a are locked together at their outer surfaces by tongue and groove joints at the edges of the top of the Tee shapes. The stems of the tees are notched to the underside of the Tee cross bars to receive the oval shaped cross ties 89. The notches are open at Tee bottoms, but not enough to admit the cross ties. The orifices of the cross ties have to be opened up by bending the Tee planks away from the orifices and allowing them to snap over the oval cross ties. Saw slits 100 in the notches at the stems of the tees and cut into the Tee tops weaken the Tee tops to make bending more easy. 144 is the width of the stems of the Tees, which have to be less than the space between Tee stems to allow the stems to fit together when the tongue and grooves of the Tee tops are fully engaged. 116 are the finishing nails used to tie the floating cross ties to the Tees. 147 indicate a slight space between sections of Tee planks. 148 indicates where the cross section for FIG. 7 occurs. 146 shows the section thickness.

FIG. 7 shows two half sections 31 and 31a locked together over the floating cross tie 89 and tacked together by nails 116. Closed saw slits 100 are also indicated.

FIGS. 8, 9 and 10 show how Tee shaped tongue and groove planks 31 can be locked over a fixed cross tie 89 that has been nailed into notches cut into the bearing timber 89. The top of the bearing timber 149 is the same width as the stems of the Tees 31, but less than the space between the stems of the Tees when they are interlocked by the tongue and grooves at the top of the Tees. Saw slits across the bottom of the Tee tops 100 aid in snapping the Tees over the fixed cross ties. 151 are heavy common box nails with large flat heads that securely attach the oval cross ties to the joists.

What is claimed is:

1. A dovetail joint between planking and a framing member such as a joist, stud, or rafter, the planking having a groove along one side thereof, and the framing member having a knob extending along one edge thereof;

said knob formed from rounded grooves a sixteenth of an inch deep, a quarter inch wide, and a quarter inch from said one edge, said knob being rounded to match the rounded grooves thereby forming a narrow s-shaped surface on one face of the framing member at said one edge, and a similar reverse s-shaped surface on the opposite face thereof at said one edge;

said groove formed a half-inch deep and having undercut sides to thereby correspond with the shape of the knob, said groove further including two saw slits in the bottom thereof extending a predetermined depth between the groove and the opposite side of the plank;

said knob and said groove forming a tight locking joint between said framing member and said planking.

2. The dovetail joint of claim 1, furthering including a nail connecting the planking and framing member together to prevent the planking from sliding along said knob of said framing member, said nail being located on said one side of said planking.

* * * * *